(12) United States Patent
Wang et al.

(10) Patent No.: US 11,885,327 B2
(45) Date of Patent: Jan. 30, 2024

(54) FLOW CONTROL VALVE, OIL PUMP ASSEMBLY HAVING THE FLOW CONTROL VALVE, AND SCROLL COMPRESSOR

(71) Applicant: Danfoss (Tianjin) Ltd., Tianjin (CN)

(72) Inventors: Meng Wang, Tianjin (CN); Changqiao Bao, Tianjin (CN); Kailai Zhang, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 0 days.

(21) Appl. No.: 17/560,393

(22) Filed: Dec. 23, 2021

(65) Prior Publication Data

US 2022/0196015 A1 Jun. 23, 2022

(30) Foreign Application Priority Data

Dec. 23, 2020 (CN) .......................... 202011542470.2

(51) Int. Cl.
*F04C 18/02* (2006.01)
*F04C 29/02* (2006.01)
(Continued)

(52) U.S. Cl.
CPC ........ *F04C 18/0207* (2013.01); *F04C 29/025* (2013.01); *F04D 1/00* (2013.01);
(Continued)

(58) Field of Classification Search
CPC F04C 18/0207; F04C 29/025; F04C 2240/40; F04C 2240/50; F04C 2240/60;
(Continued)

(56) References Cited

U.S. PATENT DOCUMENTS 1,028,722 A * 6/1912 Hess ...................... F04B 47/00
  417/434
2,925,243 A * 2/1960 Griswold ................ F16K 47/10
  251/117

(Continued)

FOREIGN PATENT DOCUMENTS

CN 1266951 A 9/2000
CN 1276494 A 12/2000
(Continued)

OTHER PUBLICATIONS

First Examination Report for Indian Patent Application No. 202114060291 dated Jul. 14, 2022.

*Primary Examiner* — Connor J Tremarche
(74) *Attorney, Agent, or Firm* — McCormick, Paulding & Huber PLLC (57) ABSTRACT

Embodiments of the present disclosure provide a flow control valve, an oil pump assembly having the flow control valve, and a scroll compressor. The flow control valve includes: a valve body having an inlet configured for a fluid to flow into the valve body and an outlet configured for the fluid to flow out of the valve body; a passage provided between the inlet and the outlet and extending in a predetermined direction, an area of a cross section of the passage perpendicular to the predetermined direction being negatively correlated with a distance from the cross section to the inlet; a valve element slidably provided in the passage, a flow area between the valve element and an inner wall of the passage is negatively correlated with the distance from the valve element to the inlet; and an elastic member provided in the valve body to apply an elastic force on the valve element so as to move the valve element in a direction toward the inlet. Thereby, for example, lubrication of the scroll compressor is improved.

26 Claims, 4 Drawing Sheets

(51) Int. Cl.
*F04D 1/00* (2006.01)
*F04D 29/043* (2006.01)
*F16K 15/08* (2006.01)
*F16K 27/02* (2006.01)

(52) U.S. Cl.
CPC ............ *F04D 29/043* (2013.01); *F16K 15/08* (2013.01); *F16K 27/0209* (2013.01); *F04C 2240/40* (2013.01); *F04C 2240/50* (2013.01); *F04C 2240/60* (2013.01)

(58) Field of Classification Search
CPC ........ F04D 1/00; F16K 15/08; F16K 27/0209; F16K 1/303; F16K 1/306; F16K 5/12; F16K 1/54
See application file for complete search history.

(56) References Cited

U.S. PATENT DOCUMENTS

| | | | | |
|---|---|---|---|---|
| 5,263,822 A | * | 11/1993 | Fujio | ............... F04C 27/005 418/55.6 |
| 5,683,236 A | * | 11/1997 | Harrison | ............... F04C 28/28 418/188 |
| 9,587,638 B2 | | 3/2017 | Hoppach et al. | |
| 2008/0023081 A1 | * | 1/2008 | Huber | ............... F16K 15/033 137/547 |
| 2014/0017108 A1 | | 1/2014 | Uekawa et al. | |
| 2014/0241926 A1 | * | 8/2014 | Fraser | ............... F04C 23/001 418/55.1 |

FOREIGN PATENT DOCUMENTS

| | | |
|---|---|---|
| CN | 201475456 U | 5/2010 |
| CN | 103857949 A | 6/2014 |
| CN | 103883738 A | 6/2014 |
| CN | 107401509 A | 11/2017 |
| CN | 209146358 U | 7/2019 |
| JP | H04276195 A | 10/1992 |
| KR | 100575698 B1 | 5/2006 |
| WO | 9106765 A1 | 5/1991 |
| WO | 2020/004359 A1 | 1/2020 |

\* cited by examiner

FLOW CONTROL VALVE, OIL PUMP ASSEMBLY HAVING THE FLOW CONTROL VALVE, AND SCROLL COMPRESSOR

CROSS-REFERENCE TO RELATED APPLICATION

This application claims foreign priority benefits under 35 U.S.C. § 119 to Chinese Patent Application No. 202011542470.2 filed on Dec. 23, 2020, the content of which is hereby incorporated by reference in its entirety.

TECHNICAL FIELD

Embodiments of the present disclosure relate to a flow control valve, an oil pump assembly having the flow control valve, and a scroll compressor.

BACKGROUND

A scroll compressor includes a static scroll, an orbiting scroll and an oil pump which is used for supplying a lubricating oil.

SUMMARY

Embodiments of the present disclosure provide a flow control valve, an oil pump assembly having the flow control valve, and a scroll compressor having the flow control valve or the oil pump assembly, thereby, for example, improving lubrication of the scroll compressor.

According to an embodiment of the present disclosure, a flow control valve is provided. The flow control valve includes: a valve body having an inlet configured for a fluid to flow into the valve body and an outlet configured for the fluid to flow out of the valve body; a passage provided between the inlet and the outlet and extending in a predetermined direction, an area of a cross section of the passage perpendicular to the predetermined direction being negatively correlated with a distance from the cross section to the inlet; a valve element slidably provided in the passage, a flow area between the valve element and an inner wall of the passage being negatively correlated with a distance from the valve element to the inlet; and an elastic member provided in the valve body to apply an elastic force on the valve element so as to move the valve element in a direction toward the inlet.

According to an embodiment of the present disclosure, the flow control valve further comprises: an inner passage member provided in the valve body, wherein the passage is formed between a first portion of an inner wall of the valve body and a second portion of an outer wall of the inner passage member, and the cross section of the passage perpendicular to the predetermined direction has an annular shape, the valve element being in an annular shape in a top view when viewed in the predetermined direction, and the first portion and the second portion extending gradually closer to each other in a direction away from the inlet.

According to an embodiment of the present disclosure, the annular shape of the passage and the annular shape of the valve element are circular, and the first portion and the second portion each have a circular shape.

According to an embodiment of the present disclosure, one of the first portion of the inner wall of the valve body and the second portion of the outer wall of the inner passage member has a cylindrical surface, and the other of the first portion of the inner wall of the valve body and the second portion of the outer wall of the inner passage member has a truncated cone surface.

According to an embodiment of the present disclosure, the first portion of the inner wall of the valve body has a cylindrical surface, and the second portion of the outer wall of the inner passage member has a truncated cone surface, the first portion of the inner wall of the valve body serving as a guiding member for the valve element.

According to an embodiment of the present disclosure, the valve element comprises: a plate-shaped third portion extending in a plane perpendicular to the predetermined direction, the third portion having a shape of circular ring when viewed in the predetermined direction.

According to an embodiment of the present disclosure, the valve element further comprises: an annular fourth portion extending from a periphery of the third portion in the predetermined direction, the fourth portion being slidable along the first portion of the inner wall of the valve body.

According to an embodiment of the present disclosure, the fourth portion of the valve element extends from the periphery of the third portion in the direction away from the inlet.

According to an embodiment of the present disclosure, the flow control valve further comprises: a guiding member provided in the valve body to guide the valve element to slide along the guiding member in the predetermined direction.

According to an embodiment of the present disclosure, the passage is formed in the first portion of the inner wall of the valve body, and the first portion of the inner wall of the valve body is gradually close to a center line of the first portion of the inner wall of the valve body in the direction away from the inlet.

According to an embodiment of the present disclosure, the first portion of the inner wall of the valve body has a circular shape in a cross section perpendicular to the predetermined direction, and a periphery of the valve element has a circular shape when viewed in the predetermined direction.

According to an embodiment of the present disclosure, the first portion of the inner wall of the valve body has a truncated cone surface.

According to an embodiment of the present disclosure, the valve element comprises: a plate-shaped third portion extending in a plane perpendicular to the predetermined direction, the third portion having a circular shape when viewed in the predetermined direction.

According to an embodiment of the present disclosure, the valve element has a center hole, the guiding member is in a rod shape, and the guiding member passes through the center hole of the valve element to guide the valve element to slide along the guiding member in the predetermined direction.

According to an embodiment of the present disclosure, the elastic member is disposed on a side of the valve element away from the inlet, and is a coil spring.

According to an embodiment of the present disclosure, an oil pump assembly for a scroll compressor is provided. The oil pump assembly includes: an oil pump having an inlet and an outlet; and the abovementioned flow control valve, the inlet of the flow control valve being communicated with the outlet of the oil pump.

According to an embodiment of the present disclosure, the oil pump comprises a transmission shaft and a driving member that is coupled to the transmission shaft to drive oil to flow in from the inlet of the oil pump and to flow out of the outlet of the oil pump.

According to an embodiment of the present disclosure, the transmission shaft of the oil pump extends in the predetermined direction and passes through the flow control valve, the driving member of the oil pump is provided at a lower side of the passage of the flow control valve, and the valve element is provided at an upper side of the driving member of the oil pump.

According to an embodiment of the present disclosure, the flow control valve further comprises an inner passage member provided in the valve body, wherein the passage is formed between a first portion of an inner wall of the valve body and a second portion of an outer wall of the inner passage member, the first portion of the inner wall of the valve body has a cylindrical surface, and the second portion of the outer wall of the inner passage member has a truncated cone surface, wherein the inner passage member is fixed to the transmission shaft of the oil pump and is provided on an upper side of the driving member of the oil pump; and wherein the valve element comprises a plate-shaped third portion extending in a plane perpendicular to the predetermined direction, the third portion having a shape of circular ring when viewed in the predetermined direction.

According to an embodiment of the present disclosure, the oil pump is a centrifugal pump, and the driving member of the oil pump is an impeller.

According to an embodiment of the present disclosure, a scroll compressor is provided. The scroll compressor includes: the abovementioned flow control valve, or the abovementioned oil pump assembly; and a motor that comprises a stator, a rotor provided in the stator, and a driving shaft to which the rotor is connected; wherein the driving shaft comprises a first end, a second end, an oil supply channel that extends in the driving shaft from the first end to the second end of the driving shaft, and a discharge channel extending in a direction that intersects an axial direction of the driving shaft and communicated with the oil supply channel, and wherein the oil supply channel of the driving shaft is fluidly communicated with the outlet of valve body of the flow control valve at the first end of the driving shaft.

According to an embodiment of the present disclosure, the scroll compressor further comprises: a first bearing that is provided at the first end of the driving shaft and above which the motor is provided; a support provided above the motor and comprising a cup-shaped main body portion and a hub provided at a lower portion of the main body portion, the hub of the support having a through hole; a second bearing that is provided in the through hole of the support and through which the driving shaft is rotatably connected to the support; a counterweight connected to the driving shaft and provided in the main body portion of the support; and an orbiting scroll comprising an end plate and a hub extending from a side of the end plate, wherein the hub and the end plate define a blind hole, the second end of the driving shaft is inserted into the blind hole and is connected to the hub of the orbiting scroll, and a lower end surface of the end plate of the orbiting scroll is in contact with an upper end surface of the main body portion of the support; and wherein the discharge channel of the driving shaft comprises: a first discharge channel leading to the first bearing, and a second discharge channel leading to the second bearing.

According to an embodiment of the present disclosure, the discharge channel of the driving shaft further comprises a third discharge channel leading to a space between the support and the motor.

According to an embodiment of the present disclosure, a gap is provided between the second end of the driving shaft and the inner wall of the blind hole, and a gap is provided between the driving shaft and the second bearing, such that oil flowing out of the oil supply channel of the driving shaft at the second end of the driving shaft flows into the main body portion, and a portion of the oil flowing out of the second discharge channel flows into the main body portion, and a portion of the oil in the main body portion flows into a space between the lower end surface of the end plate of the orbiting scroll and the upper end surface of the main body portion of the support by means of a centrifugation force exerted by the counterweight.

According to an embodiment of the present disclosure, the main body portion of the support has a through hole at a predetermined height to limit the liquid level of the oil in the main body portion of the support.

The flow control valve, the oil pump assembly having the flow control valve, and the scroll compressor having the flow control valve or the oil pump assembly, for example, improves the lubrication of the scroll compressor.

DETAILED DESCRIPTION

The embodiments of the present disclosure are described below in conjunction with the drawings.

Figure 1:
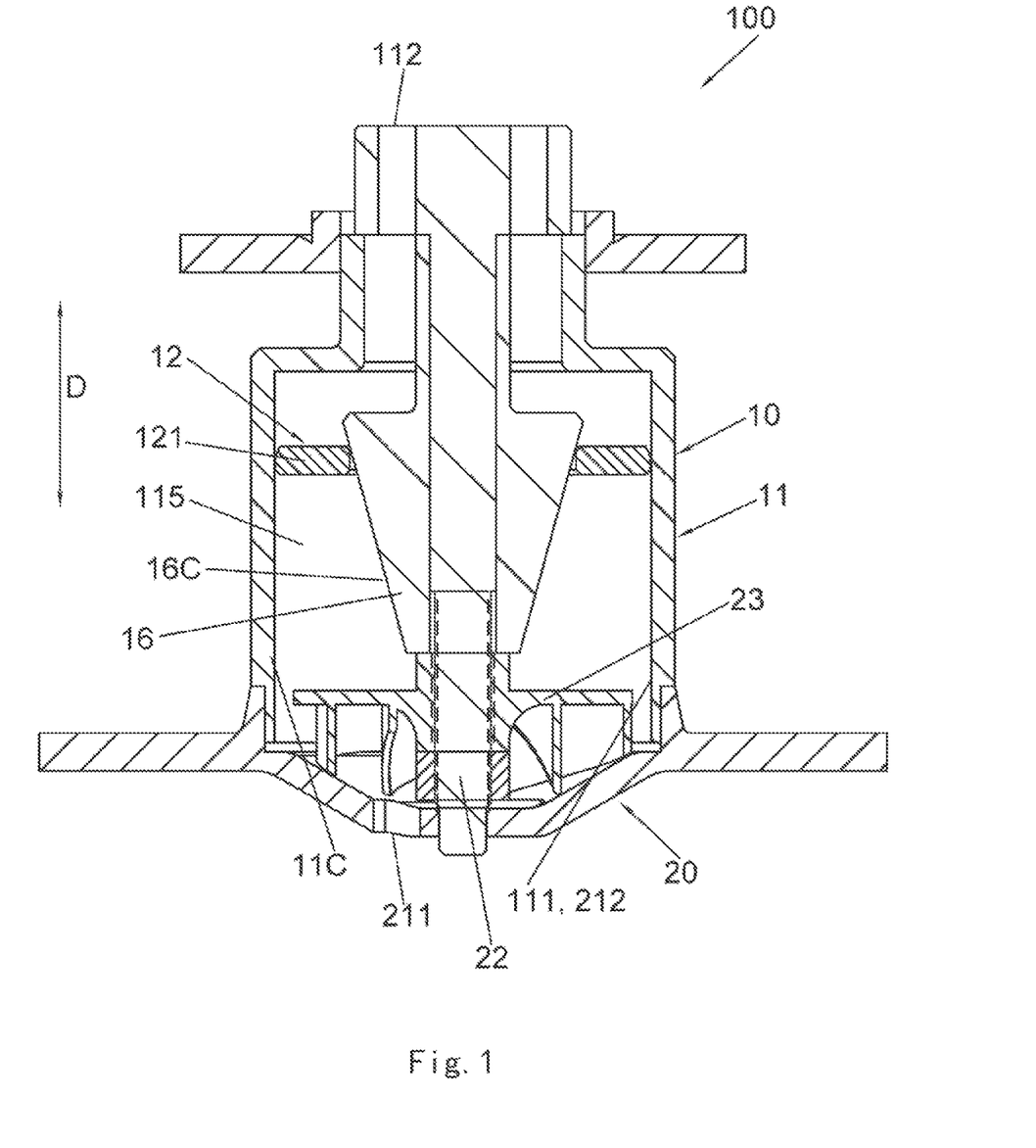
FIG. 1 is a schematic view of an oil pump assembly for a scroll compressor according to an embodiment of the present disclosure.
Figure 2:
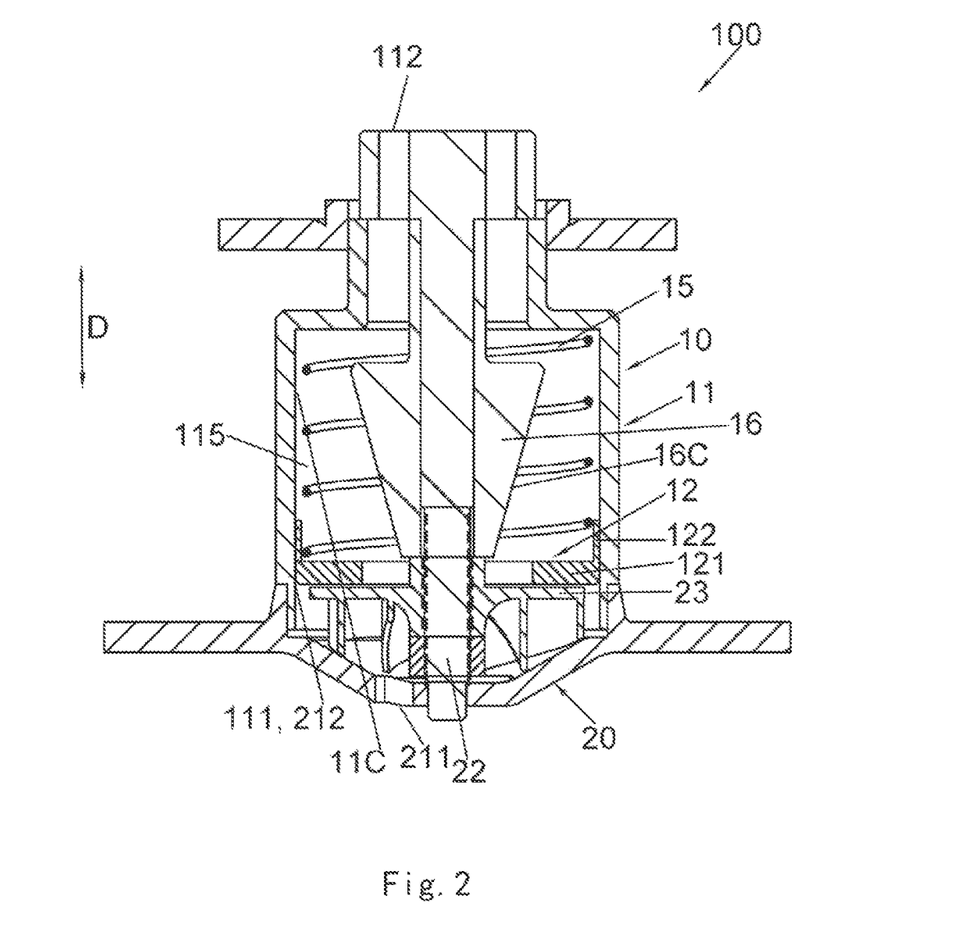
FIG. 2 is a schematic view of an oil pump assembly for a scroll compressor according to another embodiment of the present disclosure.

FIG. 1 is a schematic view of an oil pump assembly 100 for a scroll compressor according to an embodiment of the present disclosure, in which illustration of an elastic member is omitted for the sake of clarity. FIG. 2 is a schematic view of an oil pump assembly 100 for a scroll compressor according to another embodiment of the present disclosure, in which the elastic member 15 is illustrated.

Referring to FIG. 1 and FIG. 2, the flow control valve 10 according to an embodiment of the present disclosure includes: a valve body 11 having an inlet 111 configured to allow a fluid to flow into the valve body 11 and an outlet 112 configured to allow the fluid to flow out of the valve body 11; a passage 115 provided between the inlet 111 and the outlet 112 and extending in a predetermined direction D, an area of a cross section of the passage 115 perpendicular to the predetermined direction D being negatively correlated with a distance from the cross section to the inlet 111 (specifically, the area of the cross section of the passage 115 perpendicular to the predetermined direction D gradually decreases in the direction away from the inlet 111 and conversely gradually increases in the direction of the inlet 111); a valve element 12 slidably provided in the passage 115, a flow area between the valve element 12 and an inner wall of the passage 115 is negatively correlated with the distance from the valve element 12 to the inlet 111 (specifically, the farther the valve element 12 is away from the inlet 111, the smaller the flow area between the valve element 12 and the inner wall of the passage 115 is, and the closer the valve element 12 is to the inlet 111, the greater the flow area between the valve element 12 and the inner wall of the passage 115 is); and an elastic member 15 provided in the valve body 11 to apply an elastic force on the valve element 12 so as to move the valve element 12 in a direction toward the inlet 111.

In some embodiments of the present disclosure, referring to FIG. 1 and FIG. 2, the flow control valve 10 further comprises: an inner passage member 16 provided in the valve body 11, wherein the passage 115 is formed between a first portion 11C of an inner wall of the valve body 11 and a second portion 16C of an outer wall of the inner passage member 16, and the cross section of the passage 15 perpendicular to the predetermined direction D has an annular shape. The valve element 12 is in an annular shape in a top view in the predetermined direction D, and the first portion 11C and the second portion 16C extend gradually closer to each other in a direction away from the inlet 111.

In some embodiments of the present disclosure, referring to FIG. 1 and FIG. 2, both the annular shape of the passage 115 and the annular shape of the valve element 12 are circular, and the first portion 11C and the second portion 16C each have a circular shape. In a cross section perpendicular to the predetermined direction D, the passage 115 has an annular shape, and both the first portion 11C of the inner wall of the valve body 11 and the second portion 16C of the outer wall of the inner passage member 16 have a circular shape. And the valve element 12 is in an annular shape when viewed in the predetermined direction D. For example, one of the first portion 11C of the inner wall of the valve body 11 and the second portion 16C of the outer wall of the inner passage member 16 has a cylindrical surface, and the other of the first portion 11C of the inner wall of the valve body 11 and the second portion 16C of the outer wall of the inner passage member 16 has a truncated cone surface. In the example shown in FIG. 1 and FIG. 2, the first portion 11C of the inner wall of the valve body 11 has a cylindrical surface, and the second portion 16C of the outer wall of the inner passage member 16 has a truncated cone surface, the first portion 11C of the inner wall of the valve body 11 serving as a guiding member of the valve element 12.

In some embodiments of the present disclosure, referring to FIG. 1 and FIG. 2, the valve element 12 comprises: a plate-shaped third portion 121 extending in a plane perpendicular to the predetermined direction D, the third portion 121 having a shape of circular ring when viewed in the predetermined direction D. According to an example of the present disclosure, as shown in FIG. 2, the valve element 12 further comprises: an annular fourth portion 122 extending from a periphery of the third portion 121 in the predetermined direction D, the fourth portion 122 sliding along the first portion 11C of the inner wall of the valve body 11. In the embodiment of FIG. 2, the fourth portion 122 of the valve element 12 extends from the periphery of the third portion 121 in the direction away from the inlet 111. In this case, the fourth portion 122 can serve as a guided member of the valve element 12, and is guided by the first portion 11C of the inner wall of the valve body 11. In addition, the valve element 12 can serve as a positioning seat of the elastic member 15. For example, the valve element 12 can serve as a spring seat when the elastic member 15 is a coil spring.

In some embodiments of the present disclosure, referring to FIG. 1 and FIG. 2, the flow control valve 10 further includes: a guiding member provided in the valve body 11 to guide the valve element 12 to slide along the guiding member in the predetermined direction D. In this case, the first portion 11C of the inner wall of the valve body 11 does not serve as the guiding member of the valve element 12.

In some embodiments of the present disclosure, referring to FIG. 1 and FIG. 2, the passage 115 is formed in the first portion 11C of the inner wall of the valve body 11, and the first portion 11C of the inner wall of the valve body 11 is gradually closer to a center line of the first portion 11C of the inner wall of the valve body 11 in the direction away from the inlet 111. In this case, no inner passage member 16 may be provided, or no inner passage member 16 with truncated cone surface may be provided (for example, the inner passage member 16 may have a cylindrical surface). According to an example of the present disclosure, in a cross section perpendicular to the predetermined direction D, the first portion 11C of the inner wall of the valve body 11 has a circular shape, and a periphery of the valve element 12 has a circular shape when viewed in the predetermined direction D. For example, the first portion 11C of the inner wall of the valve body 11 has a truncated cone surface. According to an example of the present disclosure, the valve element 12 comprises: a plate-shaped third portion 121 extending in a plane perpendicular to the predetermined direction D, the third portion 121 having a circular shape when viewed in the predetermined direction D. For example, the valve element 12 has a center hole, the guiding member has a rod shape, and the guiding member passes through the center hole of the valve element 12 to guide the valve element 12 to slide along the guiding member in the predetermined direction D. The guiding member may be fixed together with the valve body (for example, the guiding member is a sleeve, and a transmission shaft 22 of an oil pump 20 (which will be described hereinafter) passes through the sleeve). Alternatively, the transmission shaft 22 of the oil pump 20 can serve as the guiding member.

In some embodiments of the present disclosure, referring to FIG. 2, the elastic member 15 is provided on one side of the valve element 12 away from the inlet 111, and is a coil spring.

Referring to FIG. 1 and FIG. 2, the oil pump assembly 100 for a scroll compressor according to an embodiment of the present disclosure includes: an oil pump 20 having an inlet 211 and an outlet 212; and the abovementioned flow control valve 10, the inlet 111 of the flow control valve 10 being communicated with the outlet 212 of the oil pump 20. For example, the oil pump 20 is provided in the valve body 11, and is located below the passage 115.

In some embodiments of the present disclosure, referring to FIG. 1 and FIG. 2, the oil pump 20 has a transmission shaft 22 and a driving member 23 that is coupled to the transmission shaft 22 to drive oil to flow in from the inlet 211 of the oil pump 20 and flow out of the outlet 212 of the oil pump 20. The transmission shaft 22 is coupled to the driving shaft of the motor. In the example shown, the transmission shaft 22 of the oil pump 20 extends in the predetermined direction D and passes through the flow control valve 10, the driving member 23 of the oil pump 20 is provided at a lower side of the passage 115 of the flow control valve 10, and the valve element 12 is provided at an upper side of the driving member 23 of the oil pump 20. The oil pump 20 may be a centrifugal pump, and the driving member 23 of the oil pump 20 is an impeller. Alternatively, the oil pump 20 may be another suitable pump, such as gear pump, and correspondingly the driving member 23 of the oil pump 20 may be another driving member.

In some embodiments of the present disclosure, referring to FIG. 1 and FIG. 2, the flow control valve 10 further comprises an inner passage member 16 provided in the valve body 11. The passage 115 is formed between a first portion 11C of an inner wall of the valve body 11 and a second portion 16C of an outer wall of the inner passage member 16, the first portion 11C of the inner wall of the valve body 11 has a cylindrical surface, and the second portion 16C of the outer wall of the inner passage member 16 has a truncated cone surface. The inner passage member 16 is fixed to the transmission shaft 22 of the oil pump 20 and is provided on an upper side of the driving member 23 of the oil pump 20; and the valve element 12 comprises a plate-shaped third portion 121 extending in a plane perpendicular to the predetermined direction D, the third portion 121 having a shape of circular ring when viewed in the predetermined direction D.

In some embodiments of the present disclosure, referring to FIG. 1 and FIG. 2, the inner passage member 16 is fixed to the valve body 11.

Referring to FIG. 2, when a motor of the compressor rotates, in the oil pump assembly 100 according to an embodiment of the present disclosure, the transmission shaft 22 of the oil pump 20 is rotated together with the driving shaft of the motor to enable the impeller to rotate, and the lubricating oil flows in from the inlet 211 of the oil pump 20 and flows out from the outlet 212 of the oil pump 20, enters the inlet 111 of the flow control valve 10, and flows through the passage 115. Accordingly, the valve element 12 is pushed to move upwards. The valve element 12 is kept at a predetermined position by the elastic force of the elastic member 15. The flow area is restricted by a gap between the valve element 12 and the second portion 16C of the outer wall of the inner passage member 16. Different rotation speeds of the compressor place the valve element 12 in different positions within the passage 115. The higher the compressor rotation speed, the smaller the flow area, so that regardless of the rotation speed, the flow of the lubricating oil supplied by the oil pump 20 will not greatly vary, for example may be substantially stable.

Figure 3:
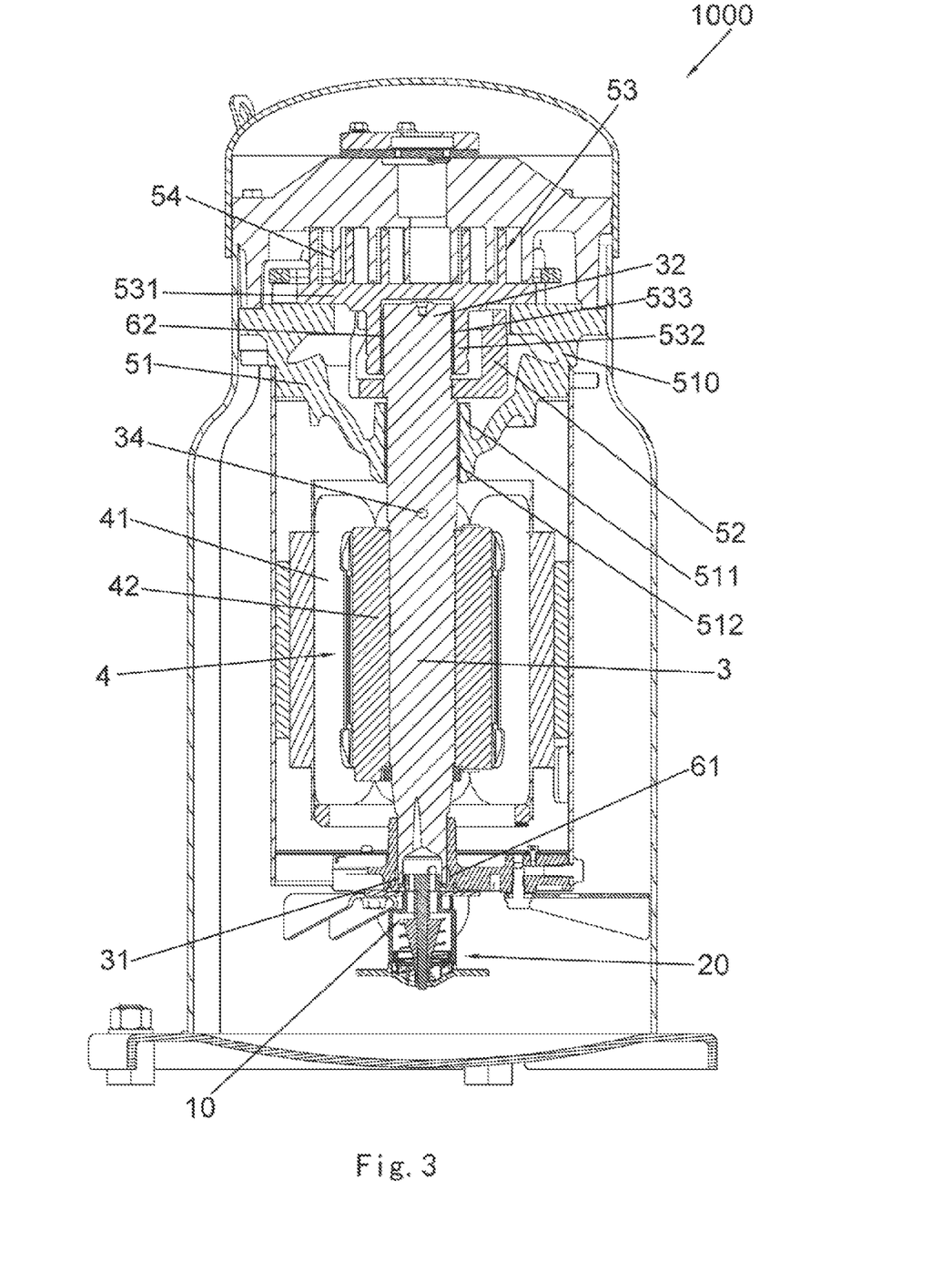
FIG. 3 is a schematic view of a scroll compressor according to an embodiment of the present disclosure.
Figure 4:
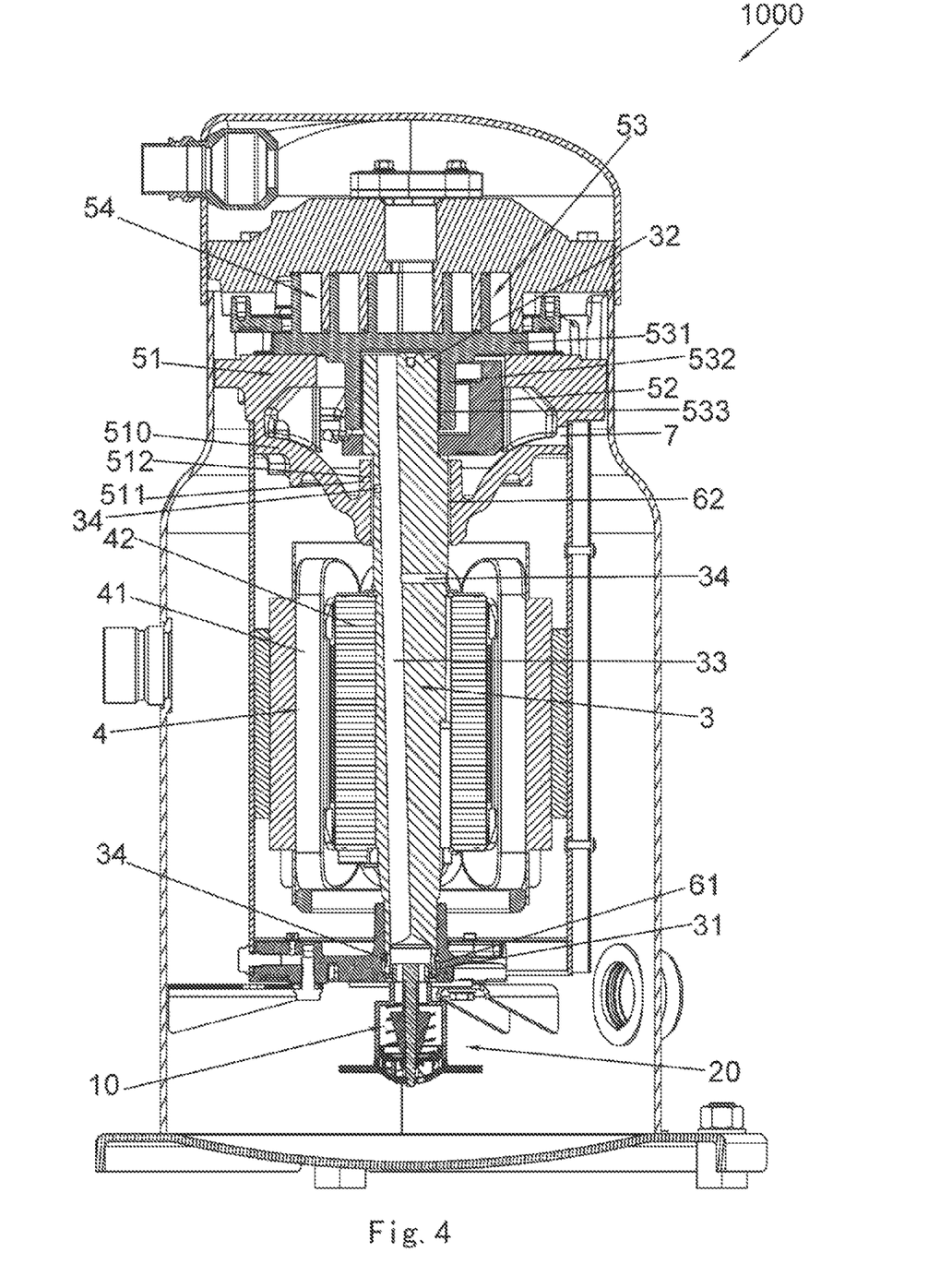
FIG. 4 is another schematic view of a scroll compressor according to an embodiment of the present disclosure.

FIG. 3 and FIG. 4 are schematic views of a scroll compressor according to an embodiment of the present disclosure. Referring to FIG. 3 and FIG. 4, the scroll compressor 1000 according to an embodiment of the present disclosure includes: a shell; the abovementioned flow control valve 10 or the abovementioned oil pump assembly 100; and a motor 4. The motor 4 comprises a stator 41, a rotor 42 provided in the stator 41, and a driving shaft 3 to which the rotor 42 is connected. The driving shaft 3 includes a first end 31, a second end 32, an oil supply channel 33 inside the driving shaft that extends from the first end 31 to the second end 32 of the driving shaft 3, and a discharge channel 34 extending in a direction that intersects an axial direction of the driving shaft 3 and communicated with the oil supply channel 33. At the first end 31 of the driving shaft 3, the oil supply channel 33 of the driving shaft 3 is fluidly communicated with the outlet of the valve body of the flow control valve 10. Referring to FIG. 3 and FIG. 4, according to an embodiment of the present disclosure, the scroll compressor 1000 further comprises: a first bearing 61, a support 51, a second bearing 62, a counterweight 52, an orbiting scroll 53, and a static scroll 54. The first bearing 61 is provided at the first end 31 of the driving shaft 3, and the motor 4 is provided above the first bearing 61. The support 51 is provided above the motor 4, and the support 51 comprises: a cup-shaped main body portion 510 and a hub 511 provided at a lower portion of the main body portion 510, the hub 511 of the support 51 having a through hole 512. The second bearing 62 is provided in the through hole 512 of the hub 511 of the support 51, and the driving shaft 3 is rotatably connected to the support 51 through the second bearing 62. The counterweight 52 is connected to the driving shaft 3 and is provided in the main body portion 510 of the support 51. The orbiting scroll 53 includes an end plate 531 and a hub 532 extending from a side of the end plate 531. The hub 532 and the end plate 531 define a blind hole 533, the second end 32 of the driving shaft 3 is inserted into the blind hole 533 and is connected to the hub 532 of the orbiting scroll 53, and a lower end surface of the end plate 531 of the orbiting scroll 53 is in contact with an upper end surface of the main body portion 510 of the support 51. The discharge channel 34 of the driving shaft 3 comprises: a first discharge channel 34 leading to the first bearing 61, and a second discharge channel 34 leading to the second bearing 62. The discharge channel 34 of the driving shaft 3 further comprises a third discharge channel 34 leading to a space between the support 51 and the motor 4, thereby cooling the motor 4.

Referring to FIG. 3 and FIG. 4, according to an embodiment of the present disclosure, a gap is provided between the second end 32 of the driving shaft 3 and the inner wall of the blind hole 533, and a gap is provided between the driving shaft 3 and the second bearing 62, such that oil flowing out of the oil supply channel 33 of the driving shaft 3 flows into the main body portion 510 at the second end 32 of the driving shaft 3, and such that a portion of the oil flowing out of the second discharge channel 34 flows into the main body portion 510, and a portion of the oil in the main body portion 510 flows between the lower end surface of the end plate 531 of the orbiting scroll 53 and the upper end surface of the main body portion 510 of the support 510 by means of a centrifugation force exerted by the counterweight 52.

Referring to FIG. 4, according to an embodiment of the present disclosure, the main body portion 510 of the support 51 has a through hole 512 at a predetermined height to limit the liquid level of the oil in the main body portion 510 of the support 51.

In addition, in the scroll compressor according to an embodiment of the present disclosure, the flow of the lubricating oil supplied from the oil tank to the internal components of the compressor by the oil pump assembly is substantially stable. The scroll compressor may be a variable speed compressor.

Referring to FIG. 3 and FIG. 4, when the compressor 1000 is operating, the motor operates, the driving shaft 3 drives the orbiting scroll 53 to rotate, and the orbiting scroll 53 cooperates with the static scroll 54 to compress the refrigerant. Meanwhile, the driving shaft 3 drives the oil pump 20 to operate, pumping the oil from the oil tank at the bottom of the compressor into the oil supply channel 33 in the driving shaft 3. The oil rises along the oil supply channel 33 under the action of centrifugal force. The oil supply channel 33 has the discharge channels at the respective bearings such that the oil enters into the bearings from the discharge channels to ensure lubrication of the bearings. Extra oil flows down from the top of the driving shaft 3, and is stored at the bottom of the support 51. The counterweight 52 on the driving shaft 3 rotates with the driving shaft 3, and the counterweight 52 agitates the oil at the bottom of the support 51. Under the action of the centrifugal force, the oil enters the sliding bearing surface between the support 51 and the orbiting scroll 53 to lubricate the contact surfaces of the support 51 and the orbiting scroll 53. Extra oil returns to the oil tank through oil holes formed in the support 51.

With the flow control valve, the oil pump assembly having the flow control valve, and the scroll compressor having the flow control valve or the oil pump assembly according to embodiments of the present disclosure, structure of the oil pump is simplified and cost of the oil pump is reduced without changing assembling process of the compressor. In addition, supply of the lubricating oil is more stable and may meet the requirements of the variable speed compressor. The oil pump assembly in the embodiments of the present disclosure may be used in the existing compressor by changing limited number of part(s).

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A flow control valve, applicable in a compressor, comprising:
   a valve body, comprising an inlet configured for a fluid to flow into the valve body and an outlet configured for the fluid to flow out of the valve body;
   a passage configured between the inlet and the outlet and extending in a predetermined direction, an area of a cross section of the passage perpendicular to the predetermined direction being negatively correlated with a distance from the cross section to the inlet;
   a valve element slidably configured in the passage, a flow area between the valve element and an inner wall of the passage being negatively correlated with a distance from the valve element to the inlet, wherein the valve element is slidable in the predetermined direction and is rotatable in response to rotation of a driving shaft in the compressor; and
   an elastic member arranged in the valve body and configured to apply an elastic force on the valve element to move the valve element in a direction toward the inlet.

2. The flow control valve according to claim 1, further comprising:
   an inner passage member provided in the valve body, wherein the passage is formed between a first portion of an inner wall of the valve body and a second portion of an outer wall of the inner passage member, and the cross section of the passage perpendicular to the predetermined direction has an annular shape, the valve element is in an annular shape in a top view when viewed in the predetermined direction, and the first portion and the second portion extend gradually closer to each other in a direction away from the inlet.

3. The flow control valve according to claim 2, wherein the annular shape of the passage and the annular shape of the valve element are circular, and the first portion and the second portion have a circular shape.

4. The flow control valve according to claim 3, wherein one of the first portion of the inner wall of the valve body and the second portion of the outer wall of the inner passage member has a cylindrical surface, and the other of the first portion of the inner wall of the valve body and the second portion of the outer wall of the inner passage member has a truncated cone surface.

5. The flow control valve according to claim 4, wherein the first portion of the inner wall of the valve body has a cylindrical surface, and the second portion of the outer wall of the inner passage member has a truncated cone surface, the first portion of the inner wall of the valve body serving as a guiding member for the valve element.

6. The flow control valve according to claim 4, wherein the valve element comprises:
   a plate-shaped third portion extending in a plane perpendicular to the predetermined direction, the third portion being in a shape of circular ring when viewed in the predetermined direction.

7. The flow control valve according to claim 6, wherein the valve element further comprises:
   an annular fourth portion extending from a periphery of the third portion in the predetermined direction, and wherein the fourth portion is slidable along the first portion of the inner wall of the valve body.

8. The flow control valve according to claim 7,
   wherein the fourth portion of the valve element extends from the periphery of the third portion in the direction away from the inlet.

9. The flow control valve according to claim 1, further comprising:
   a guiding member, configured in the valve body to guide the valve element to slide along the guiding member in the predetermined direction.

10. The flow control valve according to claim 9,
    wherein the passage is formed in the first portion of the inner wall of the valve body, and the first portion of the inner wall of the valve body extends gradually closer to a center line of the first portion of the inner wall of the valve body in a direction away from the inlet.

11. The flow control valve according to claim 10,
    wherein the first portion of the inner wall of the valve body has a circular shape in a cross section perpendicular to the predetermined direction, and a periphery of the valve element has a circular shape when viewed in the predetermined direction.

12. The flow control valve according to claim 11,
    wherein the first portion of the inner wall of the valve body has a truncated cone surface.

13. The flow control valve according to claim 12,
    wherein the valve element comprises:
    a plate-shaped third portion extending in a plane perpendicular to the predetermined direction, the third portion having a circular shape when viewed in the predetermined direction.

14. The flow control valve according to claim 13,
    wherein the valve element has a center hole, the guiding member is in a rod shape, and the guiding member passes through the center hole of the valve element to guide the valve element to slide along the guiding member in the predetermined direction.

15. The flow control valve according to claim 1,
    wherein the elastic member is disposed on a side of the valve element away from the inlet and is a coil spring.

16. An oil pump assembly for a scroll compressor, comprising:
    an oil pump having an inlet and an outlet; and
    the flow control valve according to claim 1, the inlet of the flow control valve being communicated with the outlet of the oil pump.

17. The oil pump assembly for a scroll compressor according to claim 16,
    wherein the oil pump comprises a transmission shaft and a driving member that is coupled to the transmission shaft to drive oil to flow in from the inlet of the oil pump and to flow out of the outlet of the oil pump.

18. The oil pump assembly for a scroll compressor according to claim 17,
wherein the transmission shaft of the oil pump extends in the predetermined direction and passes through the flow control valve, the driving member of the oil pump is provided at a lower side of the passage of the flow control valve, and the valve element is provided at an upper side of the driving member of the oil pump.

19. The oil pump assembly for a scroll compressor according to claim 18,
wherein the flow control valve further comprises an inner passage member provided in the valve body,
wherein the passage is formed between a first portion of an inner wall of the valve body and a second portion of an outer wall of the inner passage member, the first portion of the inner wall of the valve body has a cylindrical surface, and the second portion of the outer wall of the inner passage member has a truncated cone surface,
wherein the inner passage member is fixed to the transmission shaft of the oil pump and is provided at an upper side of the driving member of the oil pump; and
wherein the valve element comprises a plate-shaped third portion extending in a plane perpendicular to the predetermined direction, the third portion having a shape of circular ring when viewed in the predetermined direction.

20. The oil pump assembly for a scroll compressor according to claim 17,
wherein the oil pump is a centrifugal pump, and the driving member of the oil pump is an impeller.

21. A scroll compressor, comprising:
the flow control valve according claim 1, and
a motor comprising a stator, a rotor provided in the stator, and a driving shaft to which the rotor is connected;
wherein the driving shaft comprises a first end, a second end, an oil supply channel that extends in the driving shaft from the first end to the second end of the driving shaft, and a discharge channel extending in a direction that intersects an axial direction of the driving shaft and communicated with the oil supply channel, and
wherein the oil supply channel of the driving shaft is fluidly communicated with the outlet of the valve body of the flow control valve at the first end of the driving shaft.

22. The scroll compressor according to claim 21, further comprising:
a first bearing arranged at the first end of the driving shaft and the motor being arrange above the first bearing;
a support, arranged above the motor and comprising a cup-shaped main body portion and a hub provided at a lower portion of the main body portion, the hub of the support having a through hole;
a second bearing, configured in the through hole of the hub of the support, the driving shaft being rotatably connected to the support;
a counterweight, connected to the driving shaft and provided in the main body portion of the support; and
an orbiting scroll comprising an end plate and a hub extending from a side of the end plate, wherein the hub and the end plate define a blind hole, the second end of the driving shaft is inserted into the blind hole and is connected to the hub of the orbiting scroll, and a lower end surface of the end plate of the orbiting scroll is in contact with an upper end surface of the main body portion of the support; and
wherein the discharge channel of the driving shaft comprises: a first discharge channel leading to the first bearing, and a second discharge channel leading to the second bearing.

23. The oil pump assembly according to claim 22,
wherein the discharge channel of the driving shaft further comprises a third discharge channel leading to a space between the support and the motor.

24. The oil pump assembly according to claim 22,
wherein a gap is provided between the second end of the driving shaft and an inner wall of the blind hole, and a gap is provided between the driving shaft and the second bearing, such that oil flowing out of the oil supply channel of the driving shaft at the second end of the driving shaft flows into the main body portion, and
wherein a portion of the oil flowing out of the second discharge channel flows into the main body portion, and a portion of the oil in the main body portion flows into a space between the lower end surface of the end plate of the orbiting scroll and the upper end surface of the main body portion of the support by a centrifugation force generated by the counterweight.

25. A scroll compressor comprising:
the oil pump assembly according to claim 16; and
a motor comprising a stator, a rotor provided in the stator, and a driving shaft to which the rotor is connected;
wherein the driving shaft comprises a first end, a second end, an oil supply channel that extends in the driving shaft from the first end to the second end of the driving shaft, and a discharge channel extending in a direction that intersects an axial direction of the driving shaft and communicated with the oil supply channel, and
wherein the oil supply channel of the driving shaft is fluidly communicated with the outlet of the valve body of the flow control valve at the first end of the driving shaft.

26. The flow control valve according to claim 1, wherein the valve element is connected to an upper side of a driving member of an oil pump.

* * * * *